United States Patent [19]
Anderson et al.

[11] Patent Number: 5,591,496
[45] Date of Patent: Jan. 7, 1997

[54] METHOD OF MANUFACTURING COMPOSITE SHEET MATERIALS

[75] Inventors: Michael C. Anderson, West Yorkshire, Great Britain; Anthony J. Heap, Wilson, N.C.; Horst-Ditmar Grone, Schwanewede, Germany

[73] Assignee: Linpac Plastics International Limited, South Lincolnshire, England

[21] Appl. No.: 50,467

[22] PCT Filed: Oct. 28, 1991

[86] PCT No.: PCT/US91/07956

§ 371 Date: Jul. 13, 1993

§ 102(e) Date: Jul. 13, 1993

[30] Foreign Application Priority Data

Nov. 20, 1990 [DE] Germany ............... 40 37 018.6

[51] Int. Cl.⁶ ............................................. B29D 22/00
[52] U.S. Cl. ................ 428/36.5; 428/304.4; 428/903.3; 264/DIG. 10; 264/45.6; 156/244.11
[58] Field of Search ............... 428/36.5, 903.3, 428/304.4; 156/244.11; 264/DIG. 10, 45.6

[56] References Cited

U.S. PATENT DOCUMENTS 3,616,020 10/1971 Whelan .
3,669,794 6/1972 Mazur ........................... 156/244
4,410,602 10/1983 Komoda ........................ 428/516
4,474,715 12/1987 Mosier ........................... 521/54
4,943,489 7/1990 Nedzy ........................... 428/36.5
5,118,561 6/1992 Gusavage et al. .
5,128,196 7/1992 Luetkens, Jr. et al. .......... 428/213

FOREIGN PATENT DOCUMENTS 0055437 7/1982 European Pat. Off. .
0090507 10/1983 European Pat. Off. .
514422 10/1971 Switzerland .
1453344 10/1976 United Kingdom .
1521568 8/1978 United Kingdom .
WO91/13750 9/1991 WIPO .

*Primary Examiner*—Edith Buffalow
*Attorney, Agent, or Firm*—Varnum, Riddering, Schmidt & Howlett LLP

[57] ABSTRACT

A method of making a composite sheet material in which at least one lamina of previously unused expanded polystyrene is bonded to a second lamina of recycled expanded polystyrene. The laminae are continuously formed from separate extruders and are merged promptly after extrusion. Heat is applied to the laminae just before they are merged.

14 Claims, 7 Drawing Sheets

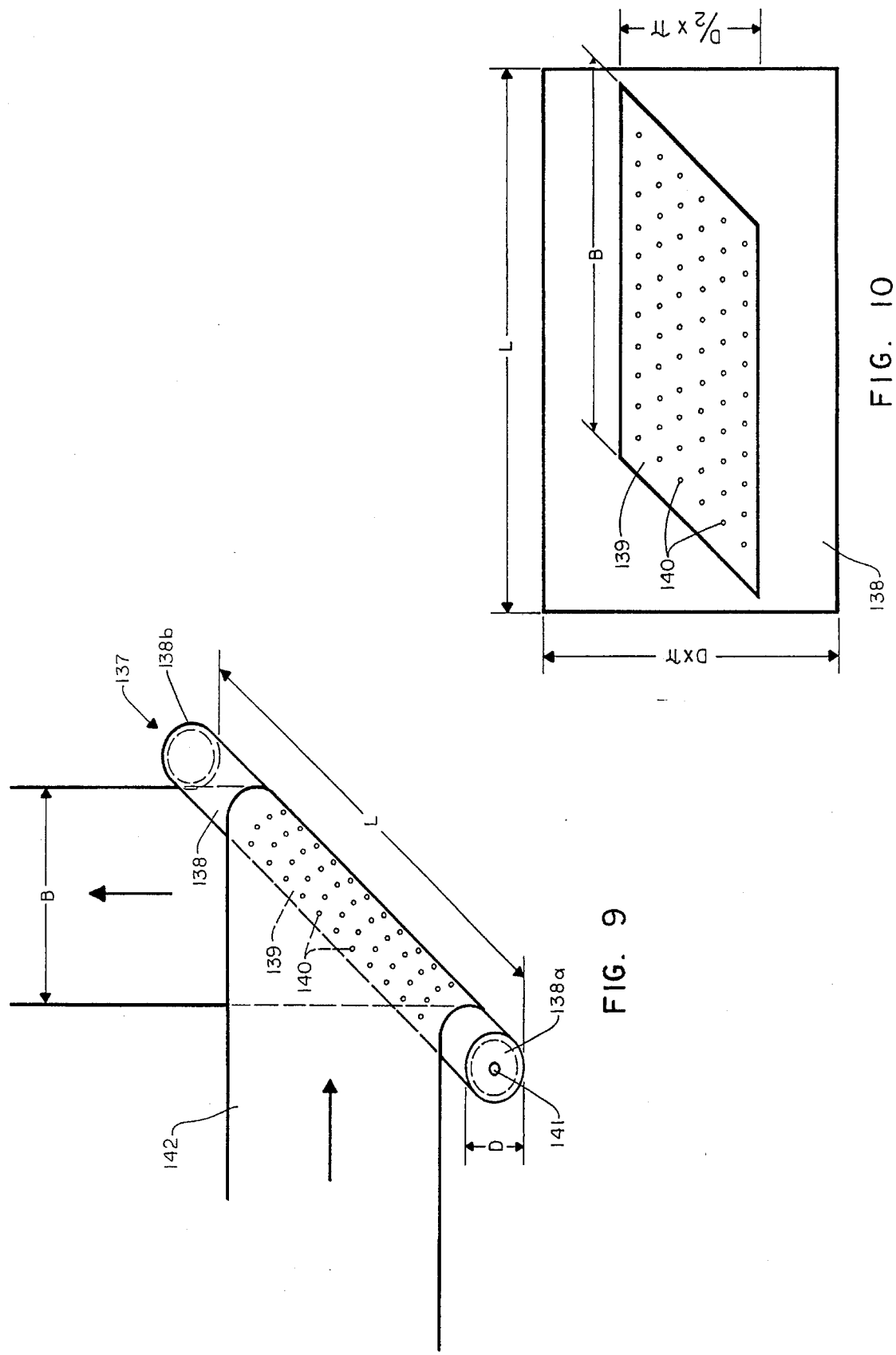

METHOD OF MANUFACTURING COMPOSITE SHEET MATERIALS

BACKGROUND OF THE INVENTION

1. Field of the Invention

This invention relates to a method of manufacturing composite sheet materials, in particular laminated sheet materials formed of layers of plastic foam such as expanded polystyrene (EPS). The invention also relates to a sheet material formed by such a method.

2. Related Art

Plastics, and in particular foamed plastics, are employed in great quantities for packaging purposes. Taking the environmental question into consideration, increasing efforts are being made to reuse these materials; that is, to recycle them. Plastics are particularly well suited for reuse in general, but the use of recycled plastics or plastic foam in packaging is inhibited by a number of problems.

On the one hand, the color of recycled plastics material is normally very difficult to alter, and in many cases will not meet requirements. Then there are the obvious psychological and hygienic considerations which apply in particular to the packaging of foodstuffs, especially where the foodstuffs might come into contact with the recycled plastic material.

To preclude any possibility of such contact and yet employ recycled material, it has long been suggested in the packaging arts that a laminate be formed in which a layer or stratum of recycled material is completely covered on at least one side by a layer of previously unused or "virgin" material. More often, to obviate any possibility of contamination or the appearance of contamination, the recycled material is encapsulated in virgin material, or in the case of sheet, foil or film a "sandwich" is formed of an inner layer of recycled material enclosed between two layers of virgin material.

EPS sheet is conventionally formed by extrusion, as by continuously extruding a cylinder or tube of EPS film, expanding the tube under internal air pressure, and slitting the expanded tube or "balloon" at one side and rolling it out to form a single sheet, or slitting it at opposite sides to form two sheets.

It is also known to form a laminate of EPS by simply introducing the extruded tube between a pair of rollers to press it flat, and then continuously trimming the lateral edges from the flattened tube. Just such a technique is disclosed in German Patent Specification No. 2,946,867, published Oct. 27, 1983 in the names of T. Komori et al.

With these considerations as a starting point, the invention addresses the problem of creating by means of a simple method sheet materials which will meet packaging requirements, yet make use of recycled plastic.

SUMMARY OF THE INVENTION

In its broader aspects, the invention provides a method of making a composite sheet material by extruding a first lamina of previously unused expanded polystyrene from a first extruder, simultaneously extruding a second lamina of recycled polystyrene from a second extruder; that is, a separate extruder, and promptly bonding the freshly extruded laminae to each other.

The laminate composition of the sheet material so formed makes it possible for the recycled layer or lamina to be shielded on at least one side with a cover lamina of fresh or virgin material, and the sheet material on that side will have the appearance and properties of sheet material formed entirely of virgin plastic.

Improved bonding may be facilitated by applying heat to at one or both of the laminae across the full width thereof immediately before the bonding step is carried out.

In a preferred method according to the invention, not one but a pair of cover laminae is extruded of previously unused expanded polystyrene from the first extruder, and the freshly extruded recycled lamina is promptly enclosed between the freshly extruded cover laminae. Both cover laminae are then immediately bonded to the recycled lamina. Here again, bonding may be facilitated by applying heat immediately before the bonding is carried out.

When sheet material formed according to the invention includes a recycled lamina covered on both-sides in this manner, it is embedded in virgin material. It will be apparent that such a sheet material is particularly well suited for the packaging of foodstuffs in that the cover lamina on the inner side of the sheet prevents the food from coming in contact with the recycled lamina. The other or outer cover lamina provides the packaging with an exterior which is comparable with packaging made completely of virgin EPS, and among other things is especially well suited for printing.

In keeping with the-purpose of employing as great a proportion of recycled material as possible, the thickness of the recycled lamina or laminae is preferably greater than the thickness of each cover lamina, and even more preferably, greater than the overall thickness of both cover laminae. The proportion of virgin material is preferably within the range of from ten to 40 percent of the total for the sheet.

By employing more than one extruder, it is possible to produce the recycled lamina or laminae and the cover lamina or laminae continuously and simultaneously, the sheet material according to the invention being formed simply by merging both or all the laminae freshly from the respective extruders. The cost of employing plural extruders is offset by the multiplied manufacturing capacity.

It has been found, moreover, that when the merging and bonding is carried out with freshly extruded laminae, not only is a better bond achieved than when one or more of the laminae is not fresh from the extruder, but also that the resulting composite sheet material is much more suitable for subsequent forming operations.

Other objects, features and advantages of the invention will be apparent from the ensuing description in conjunction with the accompanying drawings.

THE DRAWINGS

In the drawings:

FIG. 9 is a perspective view of a preferred form of a deflecting roll employed in carrying out the methods of FIGS. 5 to 8; and FIG. 10 is a planar projection of the surface of the deflecting roll of FIG. 10.

DETAILED DESCRIPTION

Figure 1:
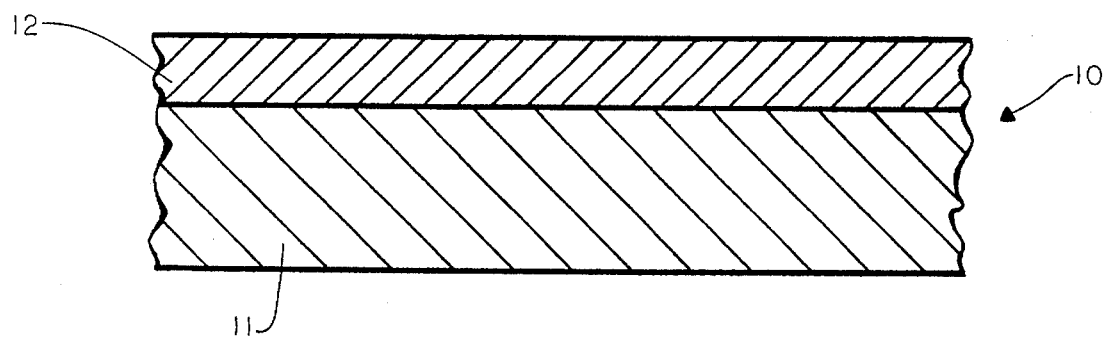
FIG. 1 is an enlarged partial cross-sectional view of a first embodiment of sheet material formed according to the invention.
Figure 3:
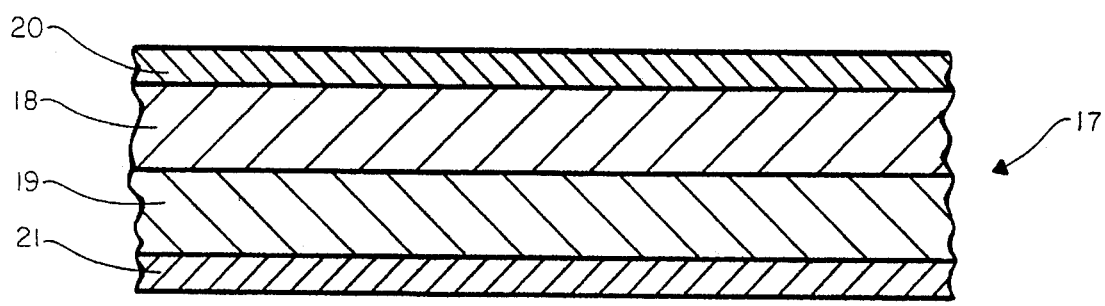
FIG. 3 is a view similar to FIGS. 1 and 2, but showing a third embodiment of sheet material formed according to the invention.

FIGS. 1 and 3 show three examples of a variety of laminate sheet materials which may be formed according to the invention and which are suitable for use in packaging, printed or otherwise, especially the packaging of foodstuffs. The laminae of the sheet material in each example comprise foam plastic, specifically expanded polystyrene.

FIG. 1 shows a sheet material 10 comprising a laminate formed of two laminae of different thicknesses. The thicker lamina comprises recycled or reprocessed EPS. Old packaging material is preferred for the reprocessing of this plastic, but it is also conceivable that EPS waste or scrap, or old EPS material obtained from other sources, or a mixture of EPS scrap and used EPS packaging material might be used to provide the recycled lamina 11.

The thinner layer of the sheet material 10 is a cover lamina 12. This is permanently attached or bonded to one side of the recycled lamina 11 across the full width of both laminae. The cover lamina 12 preferably comprises virgin material; that is, EPS which has not been previously used and recycled; whereby the side of the sheet material 10 provided with the cover lamina 12 has the properties of sheet material made entirely of virgin EPS. The cover lamina 12 can be provided in any desired color, and it can bear printing. Because it consists of virgin material, it can be brought into contact with foodstuffs without reservation regarding hygienic considerations.

In the example shown in FIG. 1, the thickness ratio between the thinner cover lamina 12 and the thicker recycled lamina is about 1:2.5. However, the thickness ratio may be selected to favor the recycled EPS even more markedly, for example 1:5.

Figure 2:
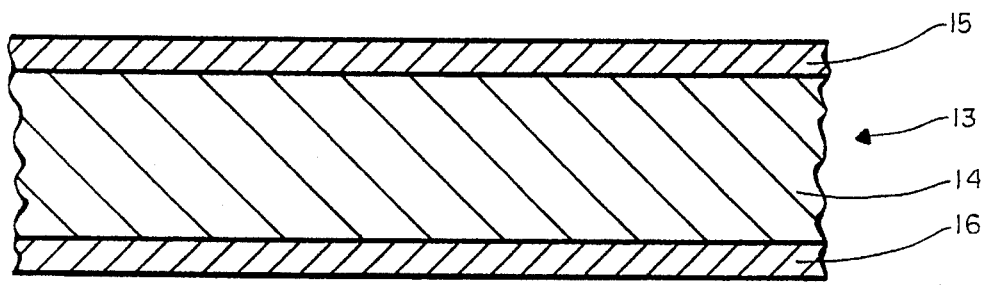
FIG. 2 is a view similar to FIG. 1, but showing a second embodiment of sheet material formed according to the invention.

FIG. 2 relates to a three-layer sheet material 13. In this case, the recycled lamina 14 is provided with two thinner cover laminae 15 and 16 to form the laminate. The cover laminae are formed of virgin foam plastic, while the substantially thicker recycled lamina 14 consists of recycled foam plastic. The feature that the recycled lamina 14 is shielded on both sides by the cover laminas 15 and 16 provides the sheet material 13 with properties, particularly visual and hygienic properties, which are comparable with sheet materials made entirely out of virgin material, despite the use of recycled EPS at its core. Here again, the upper or "outer" cover lamina 15 can be produced in any color desired, and it can be printed upon, while the lower or "inner" cover lamina 16 can be brought into contact with the foodstuffs without reservations as to hygiene.

The cover laminae 15 and 16 of the sheet material 13 are of equal thickness and are bonded to the recycled lamina 14 across the full width thereof. Each cover lamina 15, 16 amounts to about one-fifth of the thickness of the recycled lamina 14. These thickness ratios may be increased or reduced as required.

FIG. 3 shows a four-layer sheet material or laminate 17 formed of two cover laminae 20 and 21 between which are embedded two contiguous recycled laminae 18 and 19. Each of the surfaces of the two recycled laminae is permanently bonded to the adjoining surface across the full widths thereof and the recycled laminae are bonded to each other across the full widths thereof.

Owing to its four-layer formation, the sheet material 17 has a thickness ratio of 1:2.5 between the thicker recycled laminae 18 and 19, on the one hand, and the thinner cover laminae 20 and 21, on the other. As in the examples represented in FIGS. 1 and 2, the sheet material 17 can also be provided with other thickness ratios suited to particular purposes.

Broadly speaking, it is not essential in either of the examples represented in FIGS. 2 and 3 that any two or more of the laminae be of equal thickness.

Figure 4:
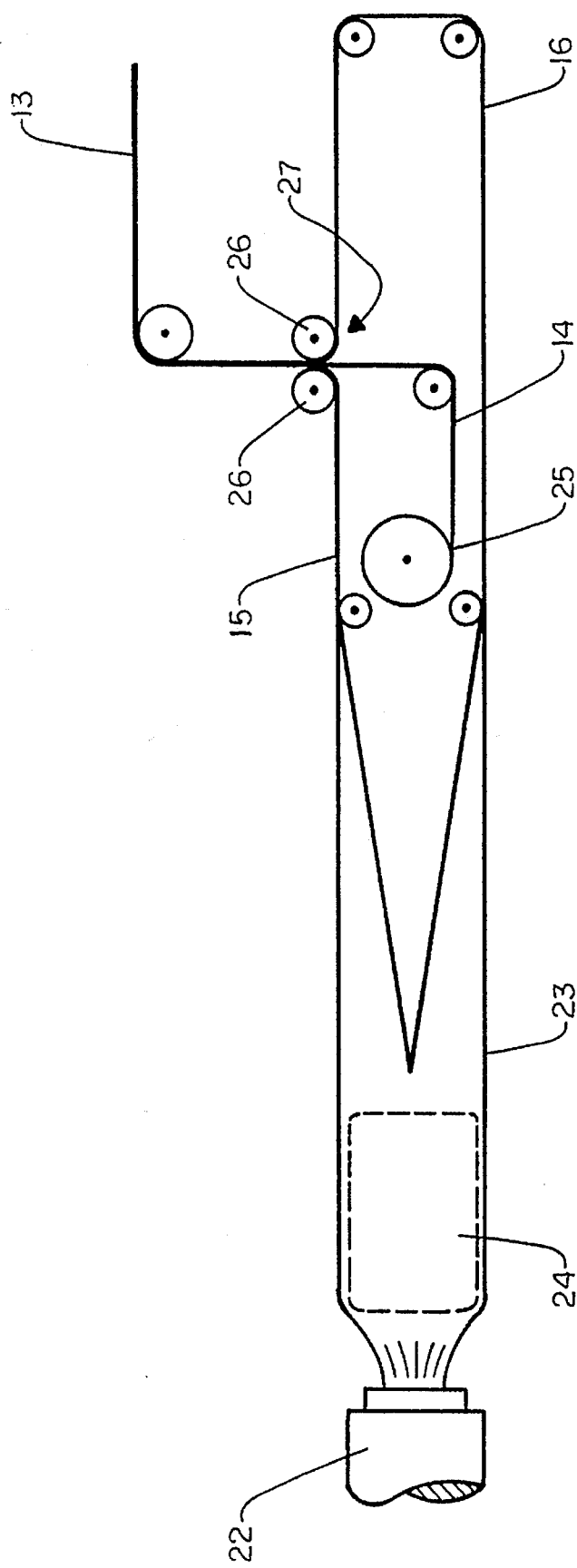
FIG. 4 is a schematic representation of a manufacturing method adapted to form the sheet material of FIG. 2.

FIG. 4 shows one method of manufacture of the sheet material 13 of FIG. 2. The two cover laminae 15 and 16 are formed continuously and simultaneously by extrusion. More particularly a film balloon 23 is created from an extruder 22, which is conducted to a cooling mandrel 24, and is then slit on opposite sides to be separated into two halves. Each of these halves, initially still rounded or domed in the balloon configuration, is rolled out or flattened in order to form the two flat cover laminae 15 and 16. The method thus far is conventional.

The recycled lamina 14, prefabricated by any suitable means such as extrusion, is continuously led from a roll 25 thereof at a rate corresponding to the rate of extrusion of the film balloon 23 to be introduced between the cover laminae 15 and 16 formed from the balloon. The bonding of the cover laminae 15 and 16 with the recycled lamina 14 is carried out by sealing, welding or other similar process across the full widths thereof. A suitable gap 27 is formed between a pair of joining rolls 26. Preferably, heating (not shown) of at least the recycled lamina 14 after it is drawn from the material roll 25 is carried out before it enters the region of the gap 27. This heating may be provided by heat radiators, i.e. radiant heat, or by heating chucks in contact with both sides of the recycled lamina 14, i.e. conductive heat. In addition, if the residual heat from the extrusion process is inadequate to provide acceptable welding or sealing between the cover laminae and the recycled lamina, the surfaces of the cover laminae 15 and 16 adjoining the recycled lamina 14 may be heated by radiant or conductive heat. In any case, the heating is carried out across the full width of the lamina so treated.

Figure 5:
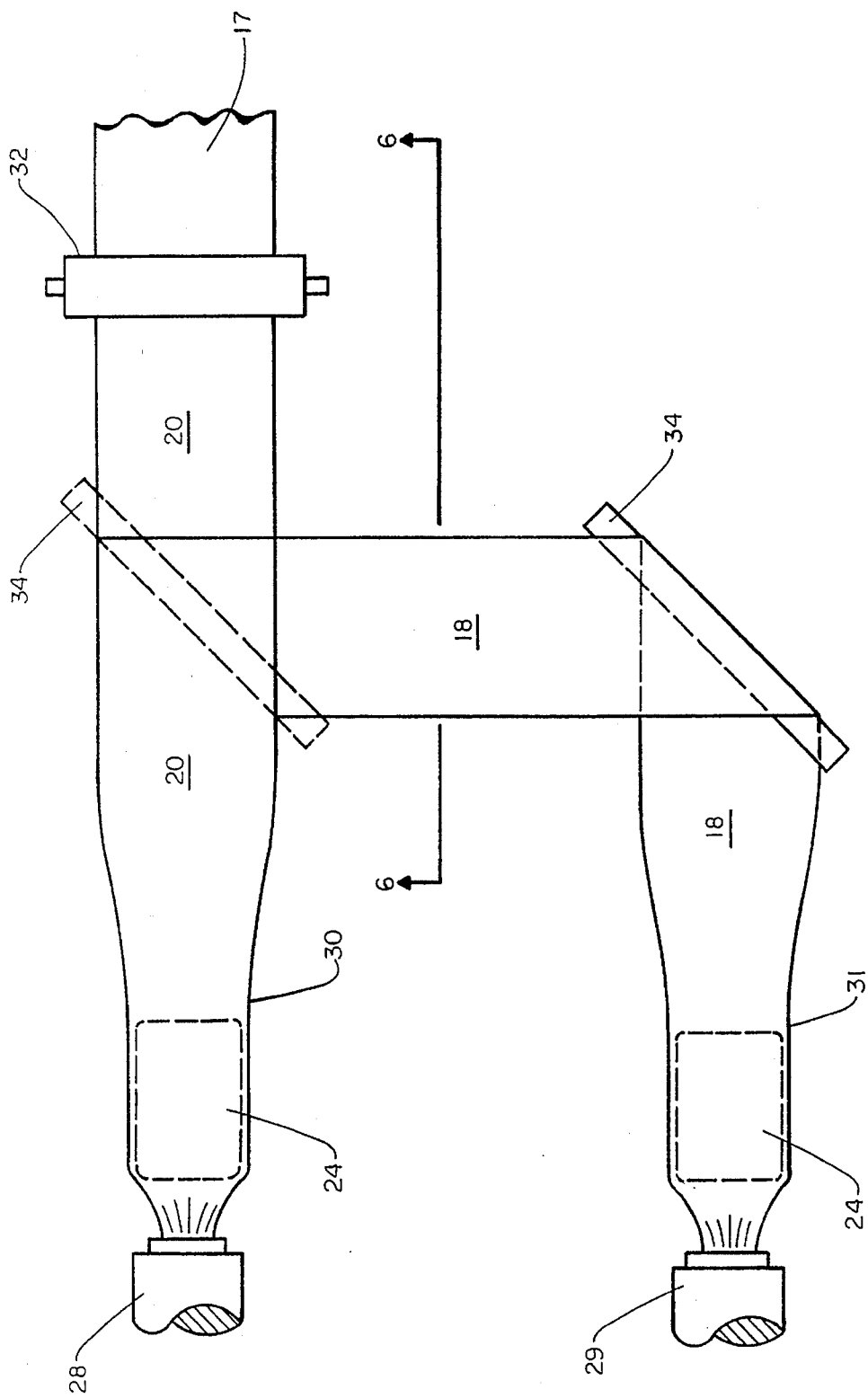
FIG. 5 is a schematic representation of a manufacturing method according to the invention, which is particularly adapted to form the sheet material of FIG. 3.
Figure 6:
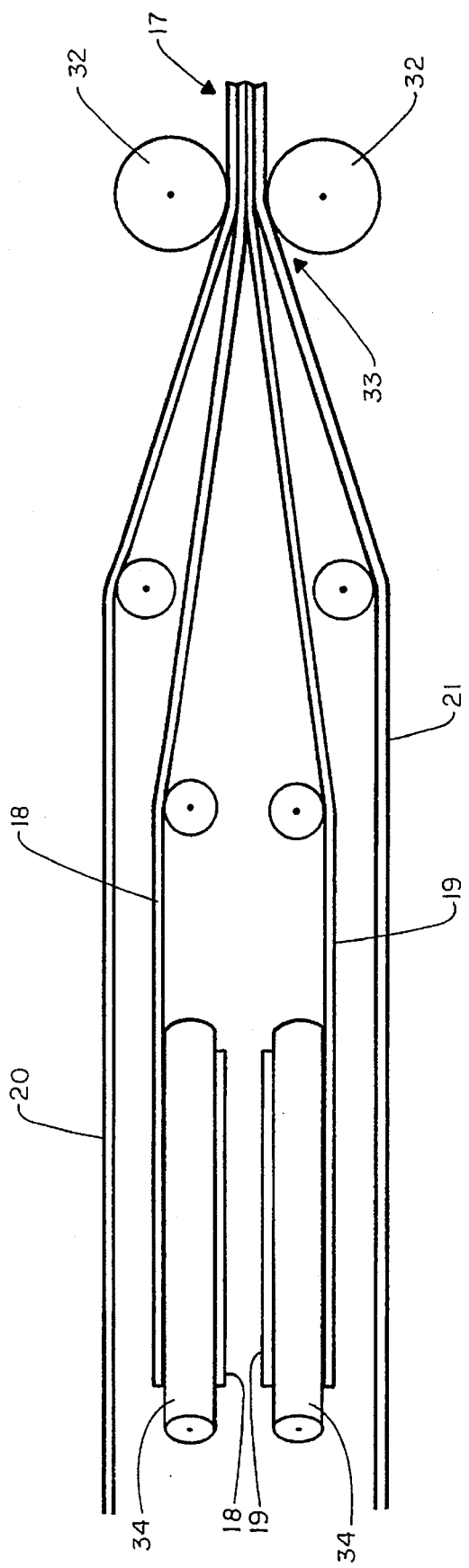
FIG. 6 is an enlarged representation taken partially along line 6—6 of FIG. 5 and showing the lamina guide prior to merging to form the sheet material.

FIGS. 5 and 6 show a method according to the invention for forming the four-layer sheet material 17 of FIG. 3. Here, two balloons 30 and 31 of EPS film are formed continuously from two parallel extruders 28 and 29. Balloon 30 comprises virgin material; that is, the extruder 28 is supplied from virgin EPS. The film balloon 31, on the other hand, is formed from recycled EPS material.

As described above, in connection with FIG. 4, each film balloon is slit at opposite sides in well-known manner to be divided in the center and the two laminae thus formed are rolled out flat. The two cover laminae 20 and 21 are formed in this manner from the film balloon 30, and the two recycled laminae 18 and 19 from the film balloon 31. The cover laminae 20 and 21 provided by the extruder 28 are led in the direction of extrusion directly to a pair of joining rolls 32, in such a manner that they enter a gap 33 between the joining rolls 32, each being engaged by a respective joining roll 32, as shown in FIG. 6.

The recycled laminae 18 and 19 provided by the extruder 29 are led between the two cover laminae 20 and 21, by double deflection at right angles, from the direction of extrusion to a direction at 90 degrees to the direction of extrusion, and again to a direction parallel with the direction of extrusion and coincident with the direction of extrusion of the cover laminae.

The double deflection is accomplished by means of two offset pairs of angled deflection rolls 34, the upper pair of which is visible in FIG. 5, one roll of each pair being represented in FIG. 6. In this manner the recycled laminae 18 and 19 are introduced to the gap 33 in the direction of extrusion of the cover laminae 20 and 21, and in the process, referring particularly to FIG. 6, are bonded with each other and with the respective cover laminae 20 and 21 across the full widths thereof.

In order to seal or weld the recycled laminae 18 and 19 and the cover laminae 20 and 21, suitable heating elements (not shown) are fitted before the roll gap 33. These heat, by radiant or conductive heat, the full widths of those surfaces of the recycled and cover laminae to be bonded.

The two-layer sheet material 10 of FIG. 1 can be formed by either of the two methods described hereinabove. Two parallel pairs of rolls, each consisting of two joining rolls 26 or 32, are associated with the extruder 22 or the extruders 28 and 29 for this purpose, and form gaps 27 or 33 located at different levels. This enables two sheets 10 to be formed simultaneously. The method represented in FIG. 4 would also be modified by the use of a pair of rolls corresponding to roll 25 to supply a recycled lamina 11 for each laminate 10, the material of each such supply roll being led to a respective gap 27 to form two laminates 10 simultaneously.

Returning now to the method represented in FIG. 4, it should be noted that the use of so-called aged EPS laminae, as from the supply roll 25, brings with it certain problems. More particularly, a single layer of EPS sheet formed by extrusion, ballooning, slitting and rolling out, as previously described, and then rolled in a spiral for storage and later use, tends almost immediately to take on an undesirable set, whereby it becomes rigid and brittle. When such a sheet is later employed in a laminate, as in the method of FIG. 4, the resulting sheet material tends to be wavy or otherwise uneven, and the brittle characteristic of the lamina is to some extent carried over to the laminate.

Even more importantly, however, the welding or bonding of such aged EPS to freshly extruded laminae is imperfect or inferior to that which can be achieved between, say, two freshly extruded sheets formed from the same tube or balloon. Though this problem may be alleviated somewhat by heating the surfaces to be bonded just before they are brought together in the gap between the forming rolls, the results tend to be uneven, and it seems the superior bond between freshly extruded laminae cannot be realized using aged EPS in any case.

Figure 7:
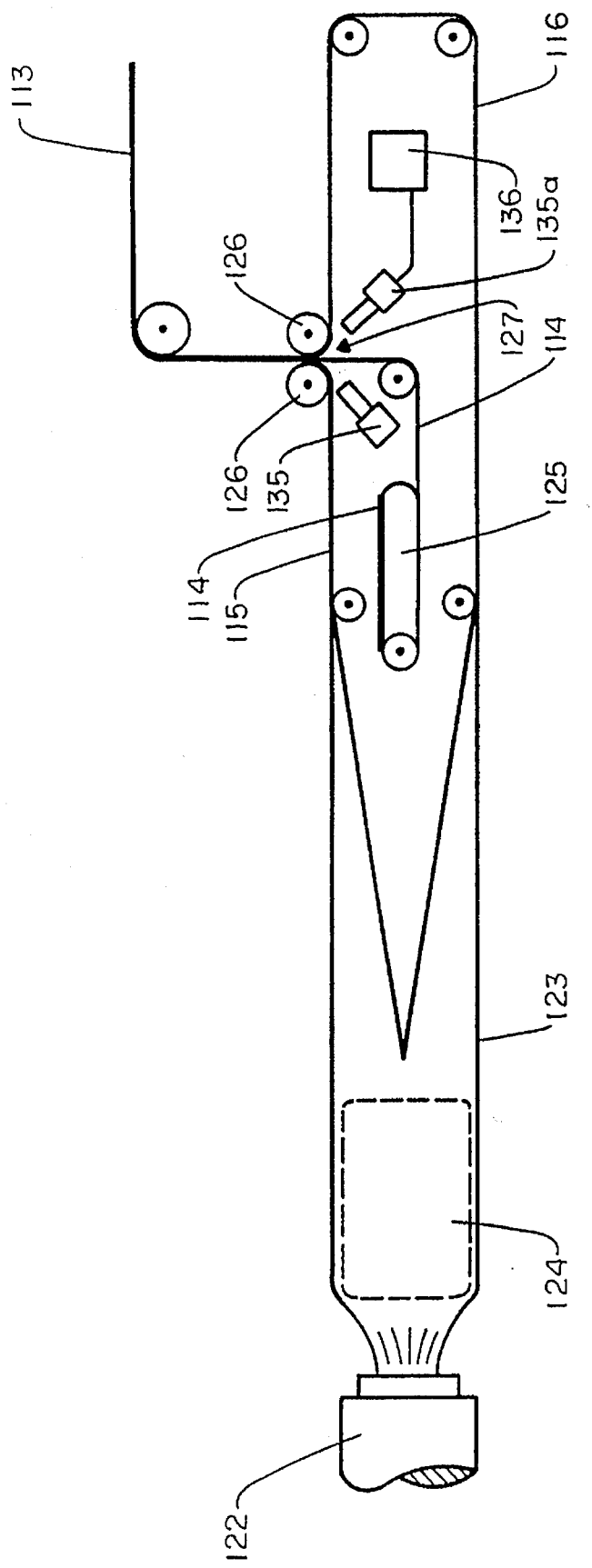
FIG. 7 is a schematic representation, similar to FIG. 4 and taken along line 7—7 of FIG. 8, of a preferred modification of the manufacturing method according to the invention.
Figure 8:
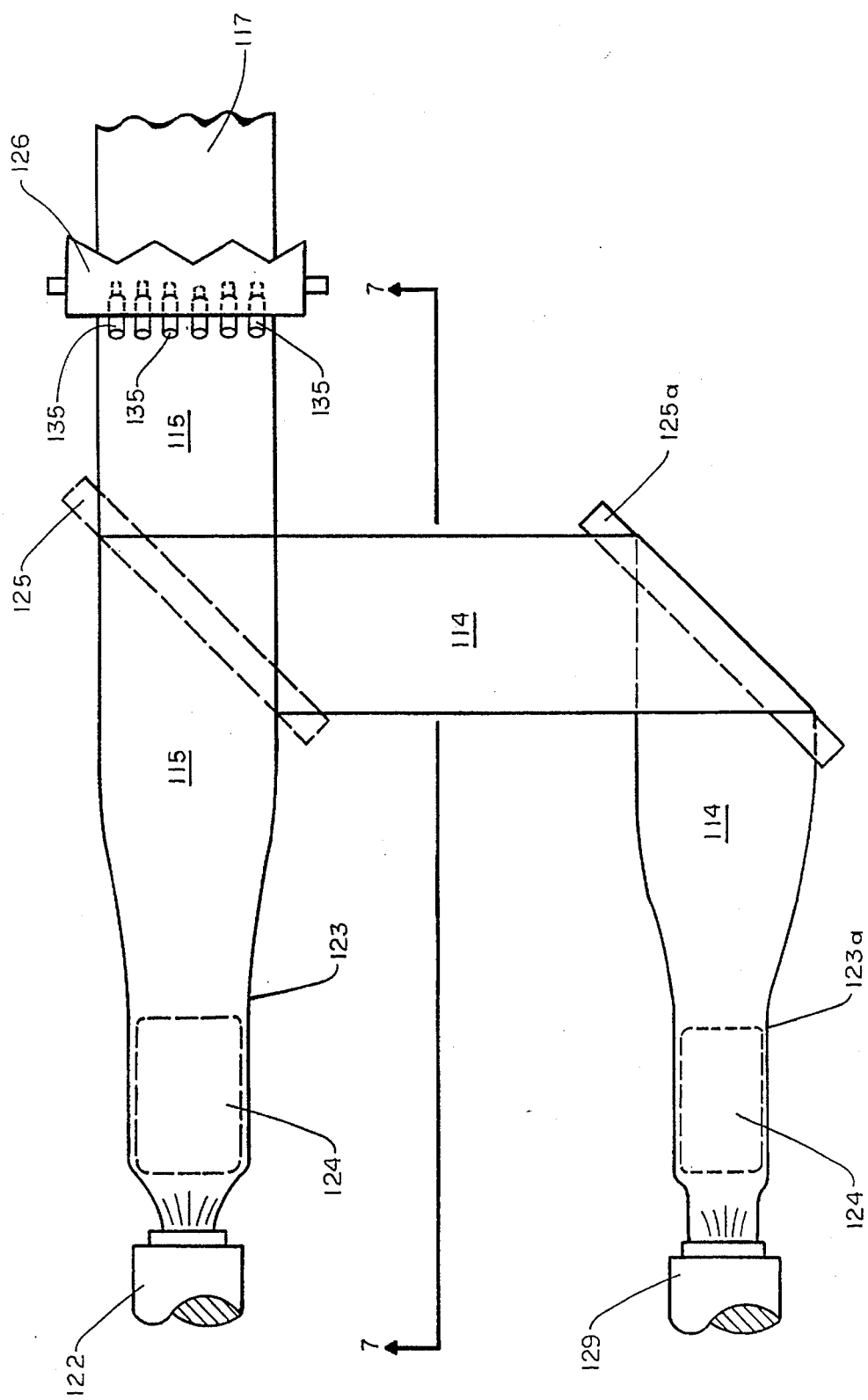
FIG. 8 is a partial plan view corresponding to the schematic representation of FIG. 7.

With these considerations in mind, reference is now made to FIGS. 7 and 8 in which is represented the preferred form of the method according to the invention. (In these figures, reference numerals which identify features corresponding to features shown in FIG. 4 have been increased by one hundred.)

The method of FIGS. 7 and 8 is similar to that of FIG. 4 except that the roll 25 of aged EPS sheet is replaced by a source of freshly extruded sheet. More particularly, a second extruder 129 is provided and arranged in parallel with the first extruder 122. The latter is supplied with virgin EPS, as before, whereas the second extruder 129 is supplied with recycled EPS. The film balloon 123a formed from the extrudate of the second extruder is slit at only one side and rolled out flat to form a single web or lamina 114 of recycled EPS, the thickness and width of which are predetermined through control of the wall thickness and diameter of the balloon 123a in well-known manner.

The recycled lamina 114 is led between the two cover laminae 115 and 116 by double deflection, in a manner similar to that represented in FIGS. 5 and 6 with regard to each of the recycled laminae 18 and 19, employing a single pair of angled deflection rolls 125 and 125a. Thus, the recycled lamina 114 is introduced to the gap 127 between the forming rolls 126 in the direction of extrusion of the cover laminae 115 and 116.

To enhance bonding, however, just before the three laminae enter the gap 127, the lamina surfaces to be bonded to each other are exposed to heat from two opposed banks of heaters 135, 135a. These heaters are preferably of a type which continuously discharge heated gases directly upon the surfaces to be heated, the source of heat being electrical heating elements or gas-combustion (neither shown), as preferred. Moreover, heater controls are preferably provided and situated conveniently for manual adjustment by an operator to regulate the temperature of the heated surfaces as they enter the gap 127. For simplicity, only one such control 136 is represented in FIG. 7, though in actuality each bank of heaters 135, 135a is provided with individual controls.

Here again, bonding is carried out across the full widths of adjacent laminae. It is also important to point out that the application of heat to laminae immediately before bonding, a preferred step in all the methods illustrated and described herein, is in every case carried out across the full width of each lamina so treated.

Sheet material 113 manufactured according to the modified and preferred method represented in FIGS. 7 and 8 will be of the general type shown at 13 in FIG. 2. It will be recognized that such a method requires less equipment than the four-layer method represented in FIGS. 5 and 6, and of course there is one fewer interface between laminae for heating and bonding.

As has been mentioned previously, a superior composite sheet material is achieved by carrying out the methods according to the invention described hereinabove with reference to FIGS. 5 and 6 and FIGS. 7 and 8, respectively, and the superior characteristics are due in large part to an improved bond thereby effected between adjacent laminae of the material. The precise physical nature of the improved bond is not presently known, but the improvement is readily discernible by comparing the appearance and performance of sheet material made by the methods according to the invention with the appearance and performance of composite sheet material made by previously known methods.

The respective sheet materials 10, 13, 17 and 113 provided by the various methods described hereinabove may be taken up in rolls (not shown) downstream when their thickness is small enough to afford the necessary flexibility, as would normally be the case when the sheet material is destined for packaging uses. However, the maximum possible thickness of the sheet material is determined only by the limitations of the extruders and other ancillary equipment available, and therefore it may be made thick enough to be cut into rigid or semirigid panels suitable for use as, for example, insulation in building construction, refrigeration and the like. It has been found that each of the outer laminae in sheet material of such great thickness should preferably comprise not less than 15 percent of the total thickness, whereby the thickness of the recycled lamina should not exceed 70 percent of the total.

FIGS. 9 and 10 illustrate, in accordance with the invention, the solution to still another problem. Even freshly extruded EPS film or sheet lacks the tensile strength and bending resilience of webs of, say, kraft paper or molecularly oriented polyethylene terephthalate. Therefore, deflection of the recycled laminae, as represented in FIGS. 5 and 8, respectively, presents the possibility of rupture of the laminae by splitting or tearing if ordinary rotating cylindrical rollers are employed as the angled deflection rolls 34, 125 and 125a, such rollers necessarily giving rise to relatively large frictional forces acting on the lamina.

Instead, it is preferred in accordance with the invention that these be air-cushion rolls, one of which is shown in FIG. 9 at 137. Such a roll comprises a cylindrical wall 138 which, with a pair of end walls 138a, 138b, encloses a hollow interior of the roll. The cylindrical wall 138 includes a working area 139 which comprises a number of small apertures 140.

The apertures pierce the wall 138 in an orderly pattern to communicate with the hollow interior of the roll. One of the end walls, 138a, is provided with an inlet opening 141 in communication with the hollow interior of the roll 137.

The outer diameter D of the roll 137 is selected to provide an outer circumference, D×π (FIG. 10), of the cylindrical wall 138 which will accommodate deflection of a lamina 142 of EPS of predetermined thickness without rupture at a predetermined rate of travel. The width B of the working area 139 (FIG. 10) is selected to correspond to the width B of the lamina 142, while the length, in this instance D/2×π (FIG. 10), of the working area 139 is calculated to correspond to that portion of the circumference which the lamina will overlie during operation. Finally, in both of FIGS. 9 and 10, the cylindrical length of the roll 137 is represented at L.

In operation, air under positive pressure is continuously introduced to the hollow interior of the roll 137 by way of the inlet opening 141 from a suitable source thereof (not shown). The air so introduced is discharged by way of the apertures 140 to provide a cushion of air which supports the lamina 142 during its deflection or change of direction without any contact with the surface of the cylindrical wall 138 and therefore with negligible frictional forces acting on the lamina.

Returning once again to FIG. 4, certain other useful laminates may be provided by providing a roll 25 of material which is not necessarily EPS but which in any case is reticulated or perforate. Such material might, for example, comprise or carry electrical circuitry, and the resulting sheet material provided might later be cut and shaped to form insulation for the interior of the roof of the passenger compartment of a motor vehicle. In such a use, the electrical circuitry thus embedded in the sheet material would be connected to energize and control the operation of the ceiling lamp or so-called dome light.

The material of the roll 25 in this instance is reticulated or perforate so that when it is brought between the cover laminae 15 and 16, the latter will bond to each other where they come into mutual contact at the interstices or perforations of the reticulated or perforate material.

Depending upon the ultimate use contemplated for the sheet material so provided, the extruded film balloon 23 and the cover lamina 15 and 16 formed therefrom might comprise recycled EPS. Alternatively, it will be recognized that the reticulated or perforate material might in similar manner be encapsulated between any two of the laminae 18, 19, 20 and 21 represented in FIG. 6.

While the invention has been particularly described in connection with certain specific embodiments thereof, it is to be understood that this is by way of illustration and not of limitation, and the scope of the appended claims should be construed as broadly as the prior art will permit.

What is claimed is:

1. A method of making a composite sheet material, comprising the steps of forming a first lamina of previously unused expanded polystyrene from a first extruder, simultaneously forming a second lamina of recycled expanded polystyrene from a second extruder, and promptly bonding the freshly extruded laminae to each other.

2. A method according to claim 1, including the step of applying heat to at least one of the laminae across the full width thereof immediately before the bonding is carried out.

3. A method according to claim 1, including the step of applying heat to both of the laminae across the full widths thereof immediately before the bonding is carried out.

4. A method of making a composite sheet material, comprising the steps of forming a pair of cover laminae of previously unused expanded polystyrene from a first extruder, simultaneously forming at least one other lamina of recycled expanded polystyrene from a second extruder, promptly enclosing the freshly extruded recycled lamina between the freshly extruded cover laminae, and immediately bonding the cover laminae to the recycled lamina.

5. A method according to claim 4, including the step of applying heat to the recycled lamina across the full width thereof immediately before enclosing the recycled lamina between the cover laminae.

6. A method according to claim 5, including the step of applying heat to the cover laminae across the full widths thereof immediately before enclosing the recycled lamina between the cover laminae.

7. A method according to claim 5, including the step of applying heat to the cover laminae and the recycled lamina across the full widths thereof immediately before enclosing the recycled lamina between the cover laminae.

8. A method of making a composite sheet material, comprising the steps of extruding a pair of cover laminae of previously unused expanded polystyrene, providing at least one other lamina of recycled expanded polystyrene, applying heat to the recycled lamina across the full width thereof, promptly enclosing the heated recycled lamina between the freshly extruded cover laminae, and immediately bonding the cover laminae to the recycled lamina.

9. A method according to claim 8, including the step of applying heat to the cover laminae across the full widths thereof simultaneously with the said application of heat to the recycled lamina.

10. A method of making a composite sheet material, comprising the steps of extruding a pair of cover laminae of expanded polystyrene, providing at least one other lamina of material having interstices formed therein, applying heat to the cover laminae across the full widths thereof, promptly enclosing the other lamina between the freshly extruded and heated cover laminae, and immediately bonding the cover laminae to each other at the interstices of the other lamina to embed the other lamina between the cover laminae.

11. A composite sheet material made by a method according to claim 1, comprising a first lamina of previously unused expanded polystyrene, and a second lamina of recycled expanded polystyrene bonded to the first lamina.

12. A composite sheet material made by a method according to claim 4, comprising a pair of cover laminae of previously unused expanded polystyrene, and at least one other lamina of recycled expanded polystyrene, the recycled lamina being enclosed between and bonded to the cover laminae.

13. A composite sheet material made by a method according to claim 8, comprising a pair of cover laminae of previously unused expanded polystyrene, and at least one other lamina of recycled expanded polystyrene, the recycled lamina being enclosed between and bonded to the cover laminae.

14. A composite sheet material made by a method according to claim 10, comprising a pair of cover laminae of previously unused expanded polystyrene, and at least one other lamina of material having interstices formed therein, the other lamina being enclosed between the cover laminae, the cover laminae being bonded to each other at the interstices of the other lamina, whereby the other lamina is embedded between the cover laminae.

* * * * *